July 18, 1933.　　　　J. N. JACOBSEN　　　　1,918,753
FLUID TREATING APPARATUS
Filed Oct. 14, 1930　　　8 Sheets-Sheet 1

INVENTOR
Jens N. Jacobsen
BY Edward H. Gumpston
his ATTORNEY

July 18, 1933.    J. N. JACOBSEN    1,918,753
FLUID TREATING APPARATUS
Filed Oct. 14, 1930    8 Sheets-Sheet 3

INVENTOR
Jens N. Jacobsen
BY Edward H. Cumpston
his ATTORNEY

July 18, 1933.  J. N. JACOBSEN  1,918,753
FLUID TREATING APPARATUS
Filed Oct. 14, 1930  8 Sheets-Sheet 4

INVENTOR
Jens N. Jacobsen
BY Edward H. Cumpston
his ATTORNEY

July 18, 1933.  J. N. JACOBSEN  1,918,753
FLUID TREATING APPARATUS
Filed Oct. 14, 1930    8 Sheets-Sheet 5

INVENTOR
Jens N. Jacobsen
BY Edward H. Crumpston
his ATTORNEY July 18, 1933.    J. N. JACOBSEN    1,918,753
FLUID TREATING APPARATUS
Filed Oct. 14, 1930    8 Sheets-Sheet 6

INVENTOR
Jens N. Jacobsen
BY Edward H. Cumpston
his ATTORNEY

July 18, 1933.    J. N. JACOBSEN    1,918,753
FLUID TREATING APPARATUS
Filed Oct. 14, 1930    8 Sheets-Sheet 8

INVENTOR
Jens N. Jacobsen
BY Edward H Cumpston
his ATTORNEY

Patented July 18, 1933

1,918,753

UNITED STATES PATENT OFFICE

JENS N. JACOBSEN, OF ROCHESTER, NEW YORK, ASSIGNOR TO THE PFAUDLER CO., OF ROCHESTER, NEW YORK, A CORPORATION OF NEW YORK

FLUID TREATING APPARATUS

Application filed October 14, 1930. Serial No. 488,690.

This invention relates to fluid treating apparatus and more particularly to apparatus embodying tanks which are alternately filled with fluid to be treated and emptied of such fluid. An object of the invention is to provide simple and satisfactory means for cleansing the interior of such tanks after a batch of fluid has been emptied therefrom and before the next succeeding batch is introduced into the tank.

A further object of the invention is the provision of cleansing mechanism of the above mentioned kind which will operate automatically without attention or supervision.

Still another object is the provision of a fluid treating system embodying a plurality of tanks, together with means for automatically filling and emptying the tanks in succession and for automatically cleaning the tanks after they have been emptied.

A further object is the provision of milk pasteurizer holding apparatus provided with means for washing the interior of the milk holding tank after each batch of milk has been emptied from the tank and before the next succeeding batch is introduced into the tank, particularly in order to remove any residual film of milk from the tank and thus to remove bacteria, such as thermophilic bacteria, which might thrive in such a film of milk and might contaminate the next batch of milk.

To these and other ends the invention resides in certain improvements and combinations of parts, all as will be hereinafter more fully described, the novel features being pointed out in the claims at the end of the specification.

In the drawings.

Similar reference numerals throughout the several views indicate the same parts.

The present invention is illustrated in the accompanying drawings and described in this specification with reference to an illustrative embodiment comprising milk pasteurizer holding apparatus, but it is to be understood that such apparatus is illustrated only by way of example and that many of the features of the invention are applicable generally to apparatus for performing various treatments on various fluids, including liquids other than milk.

Figure 7:
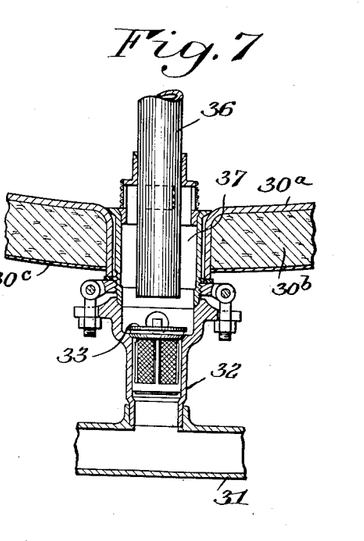
Fig. 7 is a vertical section through a fragment of the bottom of the tank, illustrating the fluid inlet.

In the present illustrative embodiment, there is shown a plurality of milk pasteurizer holding tanks each indicated in general by the numeral 30 in Figs. 1 to 4 inclusive. Each tank may comprise an inner metallic body 30a, a layer of thermal insulation 30b, and an outer covering 30c, as shown more particularly in Fig. 3. Suitable inlet and outlet connections are provided for introducing the milk or other fluid to be treated into each tank and for discharging it therefrom. In the present instance, it is desired to fill the tanks by subjecting them to vacuum, and the milk inlet connections comprise a supply conduit 31 leading from a milk heater and extending along beneath the tanks 30. This conduit has a series of upward extending branches 32, one leading to each tank, each branch including a check valve 33 as best shown in Fig. 7, which will rise from its seat to permit inflow of milk when the tank is subjected to a vacuum.

Figure 3:
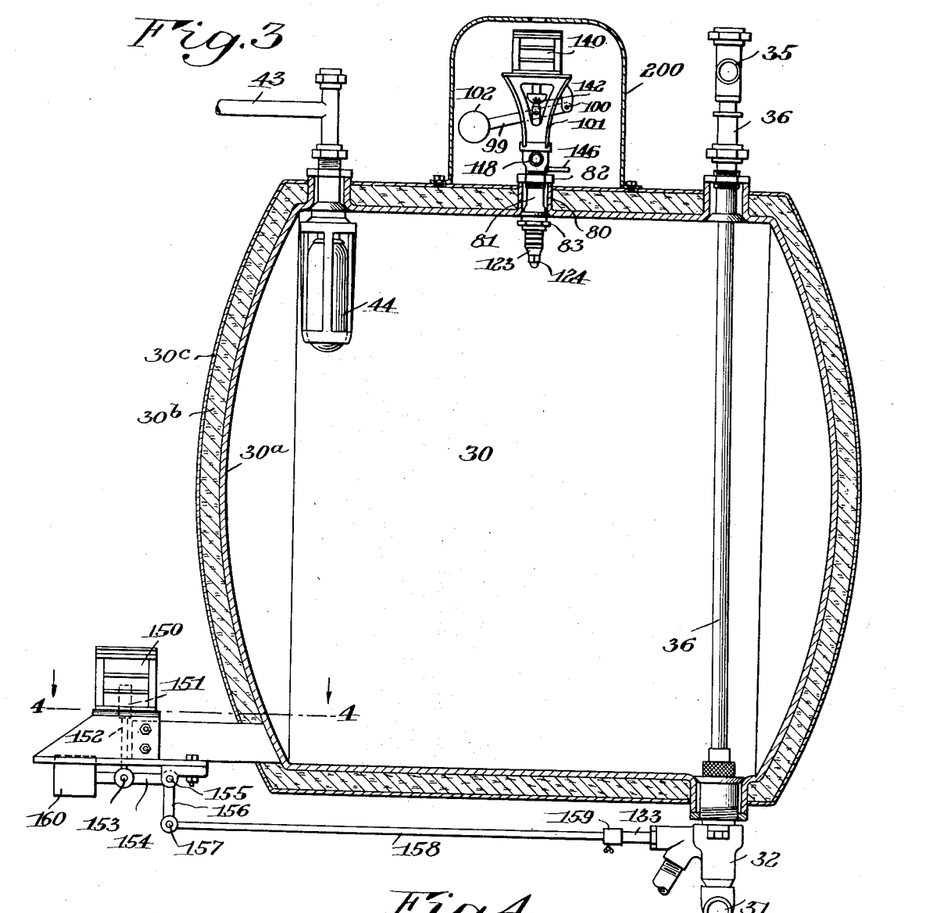
Fig. 3 is a vertical section taken longitudinally through one of the holding tanks.
Figure 4:
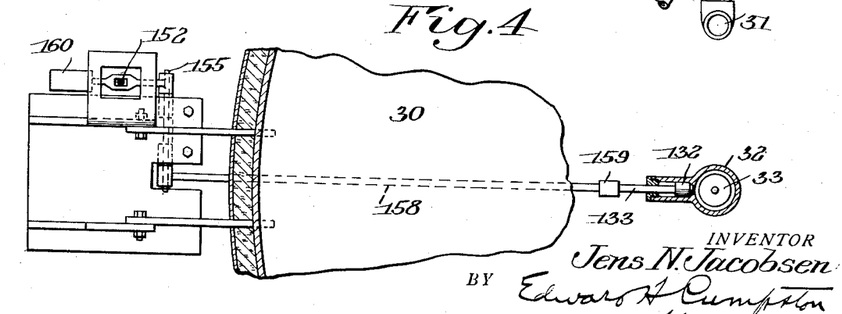
Fig. 4 is a horizontal section substantially on the line 4—4 of Fig. 3.

In the present instance it is preferred to discharge the milk from the tanks by subjecting the tanks to pressure. A discharge conduit 35 is provided extending across the tops of the tanks and having a series of downwardly extending branches 36, one associated with each tank. These branches 36 extend through the tops of the tanks and downwardly into small cavities or wells 37 at the bottoms of the tanks, as best shown in Figs. 3 and 7. When any tank which contains milk is subjected to pressure, the milk will be forced upwardly through the branch 36 and into the discharge conduit 35, from which it will pass to a milk cooler or other desired discharge point. A check valve is provided in the upper end of each branch 36, which will open to permit passage of milk upwardly through the branch in response to pressure within the tank but which will close and prevent return flow of milk when the tank is subjected to vacuum to draw milk in from the supply conduit 31. This check valve may be of substantially the same construction as the check valve 33 above mentioned, and as the check valve 89 shown in Fig. 5 of Patent No. 1,825,443, issued September 29, 1931, for a joint invention of Otto I. Chormann and the present applicant.

As will be understood by those skilled in the milk pasteurizing art, the milk is preferably heated to the desired pasteurizing temperature in a milk heater and is then transferred to a holding tank such as the tank 30 above described, where it remains for the requisite holding period in order to obtain complete pasteurization of the milk. At the termination of the holding period, the milk is discharged to a cooler or other suitable receptacle. When a plurality of holding tanks is used, the tanks are preferably filled and emptied automatically in rotation by control mechanism which operates in such a manner that while one tank is being filled, another is being emptied, and still another tank or tanks are holding milk for the required holding period.

The control mechanism in the present instance is arranged to fill and empty the tanks on the vacuum-pressure system, as above mentioned. To this end, the control mechanism comprises a master control valve having a body 40 and a valve plug 41 rotatable within the body. The body 40 has a plurality of ports 42 corresponding in number to the number of tanks employed, and each port is connected by a conduit 43 to one of the tanks. As shown in Fig. 3, the conduit 43 leads to the top of its tank and opens thereinto, the opening having associated therewith a float valve indicated generally by the numeral 44 so that if the liquid entering the tank 30 should reach a predetermined maximum level, the float valve 44 would close the entrance of the conduit 43.

Figure 14:
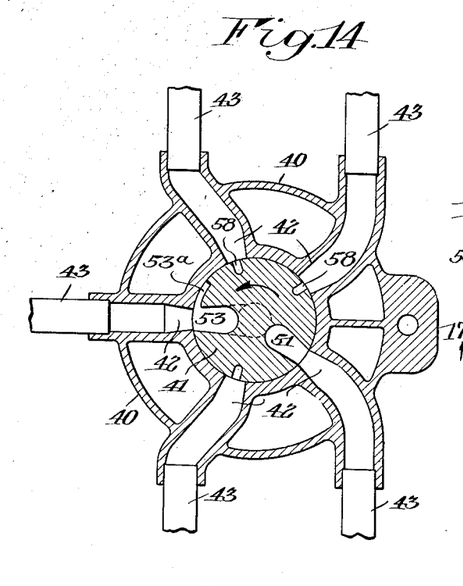
Fig. 14 is a horizontal section substantially on the line 14—14 of Fig. 12.
Figure 15:
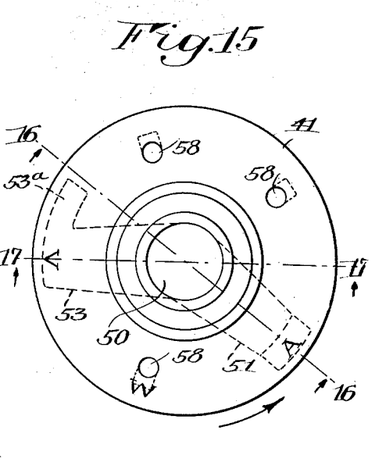
Fig. 15 is a plan of the valve plug constituting part of the control mechanism for filling and emptying the tanks.
Figure 16:
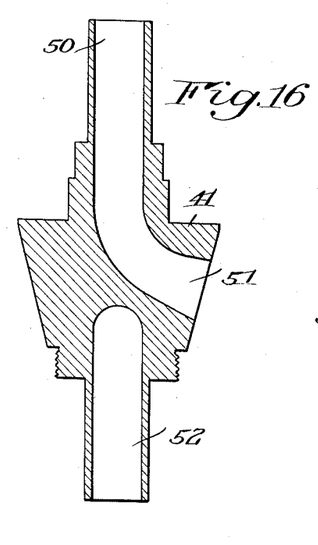
Fig. 16 is a vertical section through the valve plug taken substantially on the line 16—16 of Fig. 15.
Figure 17:
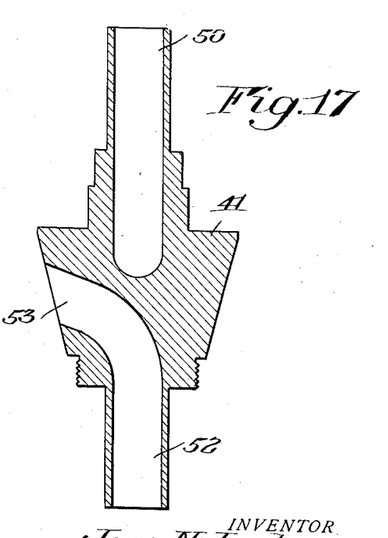
Fig. 17 is a vertical section through the valve plug taken substantially on the line 17—17 of Fig. 15.

The valve plug 41 is of the shape best shown in Figs. 14 to 17 inclusive. It comprises an upper central cavity 50, leading downwardly from the top of the valve plug and then turning and extending laterally to a port 51 in the plug which, by rotation of the plug in the body 40, may be brought into registration with any one of the ports 42. The plug further has a lower central cavity 52 extending upwardly from the bottom of the plug, then turning and terminating in a port 53 which also may be brought into registration with any one of the body ports 42 by appropriate rotation of the plug. This port 53 preferably has a lateral extension 53a, as shown in Figs. 14 and 15, so that during rotation of the valve plug, the port 53 will remain in communication with one of the ports 42 longer than the port 51 will remain in communication with a port 42.

Figure 2:
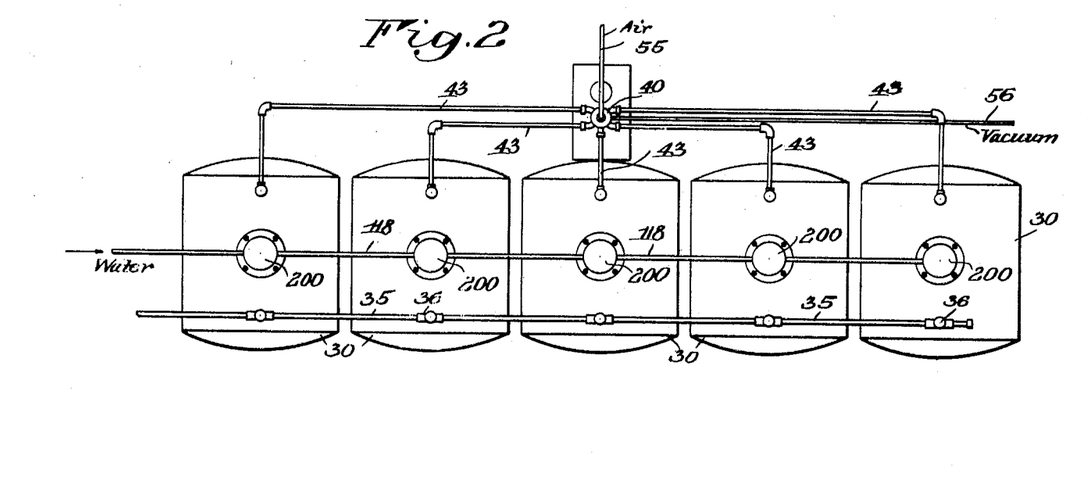
Fig. 2 is a general plan view of the apparatus shown in Fig. 1.
Figure 10:
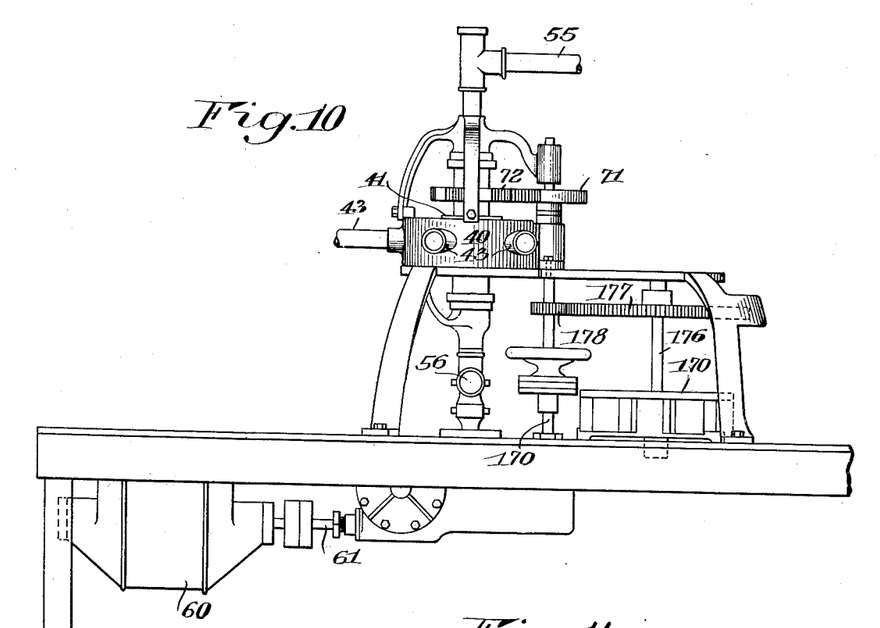
Fig. 10 is an elevation of part of the control mechanism.
Figure 11:
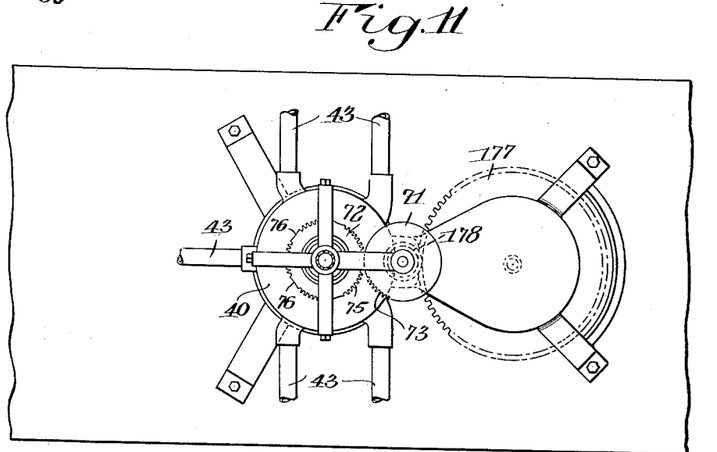
Fig. 11 is a plan thereof.

Referring now to Figs. 2 and 10, a conduit or line 55 is connected to any suitable source of pressure, preferably compressed air, which may be washed or sterilized if desired. This conduit 55 is connected to the top of the valve plug 41 by an air tight rotary joint, so that it is in communication with the upper cavity 50 of the valve plug at all times without interfering with rotation of the plug in the valve body 40.

A vacuum line or conduit 56 is also provided, leading from any suitable source of reduced pressure such as a vacuum pump.

This vacuum conduit is connected to the bottom of the valve plug 41 by an airtight rotatable joint so that it is in communication with the lower cavity 52 in all positions of the valve plug, but does not interfere with rotation thereof.

From the mechanism so far described it will be apparent that by turning the valve plug to bring the port 53 thereof into communication with any one of the body ports 42, the vacuum line 56 will be connected to the one of the tanks 30 which is in communication with that port 42. Thus the pressure within that tank will be reduced and milk will be drawn into the tank from the supply conduit 31. Similarly, by turning the valve plug to bring the port 51 into communication with any one of the body ports 42, the pressure line 55 will be connected to the one of the tanks which is connected to that port 42, and this tank will be subjected to the compressed air or other pressure, which will drive the milk upwardly through the branch 36 and into the discharge conduit 35.

Since five tanks are employed in the present instance, the ports 42 of the valve body are spaced at intervals of 72° around the body, and the ports 51 and 53 in the valve plug are placed 144° apart, all as best shown in Fig. 14. The valve plug rotates in a counterclockwise direction when viewed as in Fig. 14. From this it follows that when the pressure port 51 of the plug is in communication with one port 42, as shown in Fig. 14, the vacuum port 53 will be in communication with the second port 42 behind the one with which the pressure port 51 communicates. The other three ports 42 which are not in communication with either the vacuum or the pressure ports at this time may communicate with venting ports 58 in the valve plug, which open to the atmosphere and which simply serve to relieve the vacuum or pressure previously produced in a tank.

Figure 12:
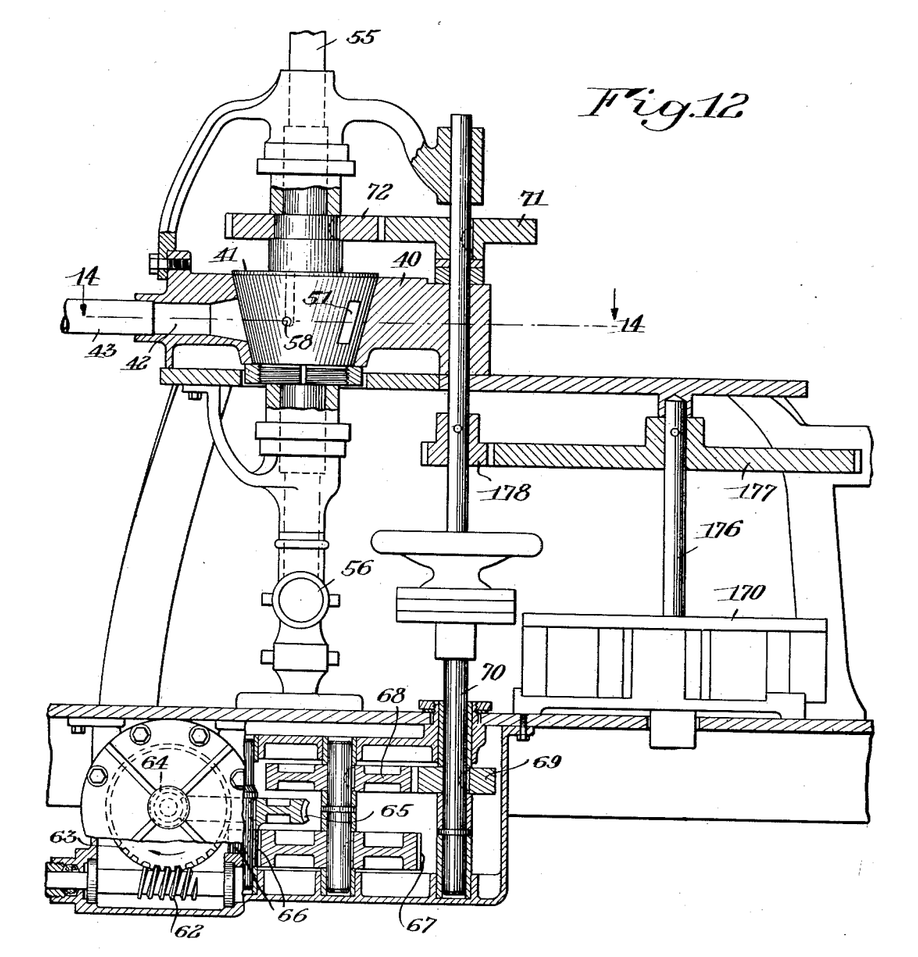
Fig. 12 is a vertical section through part of the control mechanism.

This valve plug 41 may be rotated by any suitable mechanism, preferably by automatic mechanism which moves the plug in a predetermined manner so as to fill and empty the tanks according to a predetermined schedule. The drive may comprise, for example, a motor 60 (Fig. 10) driving a worm shaft 61 carrying a worm 62 (Fig. 12) meshing with a worm wheel 63 the shaft of which, in turn, carries a worm 64 meshing with another worm wheel 65. This second worm wheel 65 has secured thereto a pinion 66 meshing with a spur gear 67 on the shaft of which is a mutilated gear 68 having teeth around half its periphery and no teeth on the other half of its periphery. The teeth on this mutilated gear 68 mesh with and drive the gear 69 of half the diameter of the gear 68, so that gear 69 will be turned through one complete revolution during one-half the revolution of the gear 68 and will remain idle during the other half of the revolution of the gear 68.

Figure 13:
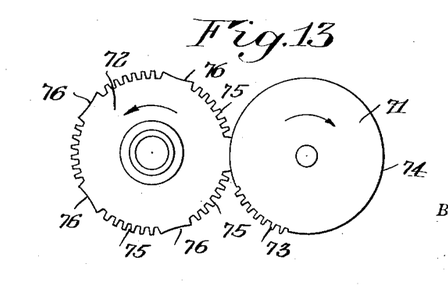
Fig. 13 is a plan of a pair of Geneva gears forming part of the control mechanism.

The gear 69 which is thus driven intermittently is secured to a vertical shaft 70 extending upwardly to a point adjacent the control valve plug 41 and provided with a Geneva driving gear 71, the shape of which is shown in Fig. 13. It meshes with a Geneva gear 72 secured to the valve plug 41. The driving gear 71 has a toothed portion 73 and a smooth peripheral portion 74, while the driven gear 72 has five toothed portions 75, and five locking portions 76. It is obvious that each time the gear 71 makes one complete revolution, the teeth 73 thereon will mesh with one group of teeth 75 on the gear 72 and will turn the latter gear through one-fifth of a revolution, and the smooth periphery 74 will then engage the locking portion 76 and hold the gear 72 stationary during the remainder of the revolution of the driving gear 71, after which the driving gear will again move the gear 72 through one-fifth of a revolution.

When the gear 72 is stationary between its intermittent movements, the ports 51 and 53 of the valve plug 41 are in registration with certain ports 42 of the valve body.

The operating mechanism may be timed to cause the liquid to remain in the tank for any desired length of time. In the present instance it is preferred to have the liquid held in each tank for approximately thirty minutes before being emptied therefrom, and to this end the gearing is so related to the speed of the motor that the gear 68 will be driven through one complete revolution in fifteen minutes. Hence the gear 69 and shaft 70 will rotate through one complete revolution in seven and one-half minutes and then will be idle for seven and one-half minutes, then will rotate again, etc. During a part of each rotation of the shaft 70, the valve plug 41 will be moved through one-fifth of a revolution. Thus the valve plug will be moved through one-fifth of a revolution each fifteen minutes.

When the valve plug is turned from any position of rest to the next succeeding position, the extension 53a of the vacuum port 53 remains in communication with the port 42 during part of the time consumed in turning the plug, and thus prolongs the time during which the vacuum line is connected to the tank, to insure ample time for filling the tank. When the extension 53a finally passes out of communication with the port 42, the holding period of the tank connected to that port begins. After about fifteen minutes, the valve plug is turned through another one-fifth revolution, but this has no effect on the milk being held in the particular tank being considered. After another period of about fifteen minutes, the valve plug is once more turned through one-fifth revolution, which brings the pressure port 51 into communication with the port 42 being considered. Thus approximately thirty minutes has elapsed from the time the vacuum line was disconnected from a port 42 to the time the pressure line is connected to the same port 42, to cause emptying of the tank connected therewith. If longer or shorter holding periods are desired, the gearing driving the shaft 70 may be changed accordingly.

When the substance being treated is milk, as in the present preferred embodiment of the apparatus, a film of milk will remain on the inner surface of each tank after the milk has been discharged therefrom. Certain bacteria, especially those known as thermophilic bacteria, are apt to be present in this film of milk and to thrive and multiply therein notwithstanding the high temperature thereof, and such bacteria may contaminate the next succeeding batch of milk which is drawn into the tank. Hence it is desirable to remove any residual milk subsequently to each emptying of the tank and prior to the next succeeding filling thereof. The present invention provides means for removing this film, which means is preferably in the form of spray means for spraying a washing liquid over the inner surface of the tank. To this end, as shown especially in Figs. 5 and 6, each tank may be provided at its top with an aperture surrounded by a flange 80 through which extends a body 81 of what may be termed a spray valve, the body being held in place by a nut 82 engaging the top of the flange 80 and a nut 83 engaging the bottom thereof and providing an air tight joint with the tank.

Figure 5:
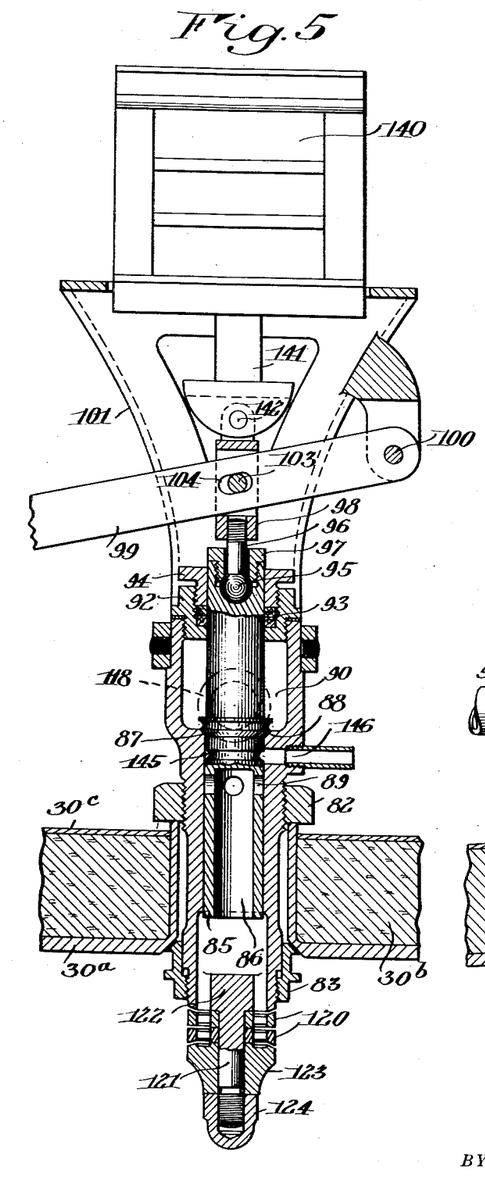
Fig. 5 is a vertical section taken centrally through a spray valve associated with each tank, with parts in elevation.

Within the valve body 81 there is movably mounted a valve member 85, the lower end of which is tubular and has a central cavity 86, as shown in Fig. 5. The valve member has a conical portion 87 which may be brought into contact with a conical valve seat 88 on the valve body to close the valve, which is illustrated in closed position in Fig. 5. When the valve is raised upwardly from its closed position, the portion 87 is unseated from the seat 88 and ports 89 extending through the sides of the tubular portion are drawn upwardly to a position above the valve seat 88, as shown in Fig. 6, so that liquid within the upper cavity 90 may flow into the ports 89 and downwardly through the central cavity 86.

The valve has an upwardly extending stem 91 passing through an opening in a head 92 in which packing 93 is retained by a gland nut 94. At the upper end of the stem 91 there is a socket to receive a ball 95 on the lower end of a stud 96, the ball being held in place by a cap 97 which is screwed down somewhat loosely to permit the ball to have freedom of movement in its socket and to permit the valve member to rotate on its axis so that it may adjust itself to any irregularities in the valve body or on the valve member. The upper end of the stud 96 is screwed into a block 98 having a central opening through which passes a lever 99, one end of which is pivoted at 100 to an ear on a bracket 101. The opposite end of the lever 99 carries a weight 102 (Fig. 3). The lever is connected to the block 98 by means of a pin 103 on the block engaging a slot 104 in the lever, so that the weight of the lever tends to force the valve member downwardly to its closed position.

Figure 1:
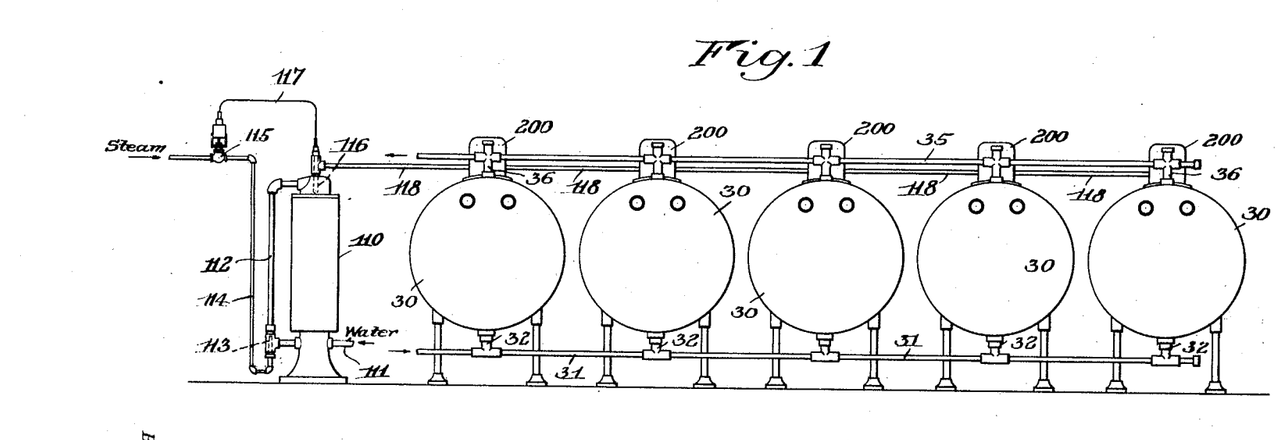
Fig. 1 is a side elevation of apparatus constructed in accordance with a preferred embodiment of the invention, showing by way of illustration a series of milk pasteurizer holding tanks.

The washing liquid employed is preferably hot water, though other washing or cleansing fluids may be used if desired. Referring now to Fig. 1, the water may be heated, for example, in a receptacle 110 supplied with cold water through an inlet 111. This receptacle has a circulating conduit 112 connected to the receptacle at top and bottom, and a steam nozzle 113 at one end of the conduit 112 is supplied with steam by a conduit 114 controlled by a valve 115. The steam issuing from the nozzle causes circulation of the water upwardly through the conduit 112 and downwardly through the main body 110 of the receptacle, at the same time heating the water to the desired degree. When the water reaches a predetermined temperature, a thermostatic device 116 near the top of the receptacle 110 closes the steam valve 115 through a suitable connection 117, and when the temperature of the water falls again, the thermostat 116 opens the valve 115 and permits additional steam to enter. Thus a constant supply of washing liquid of the desired temperature is maintained in the receptacle 110, and it is supplied therefrom by a conduit 118 leading from the top of the receptacle to the cavity 90 in the top of each spray valve on each tank.

Figure 6:
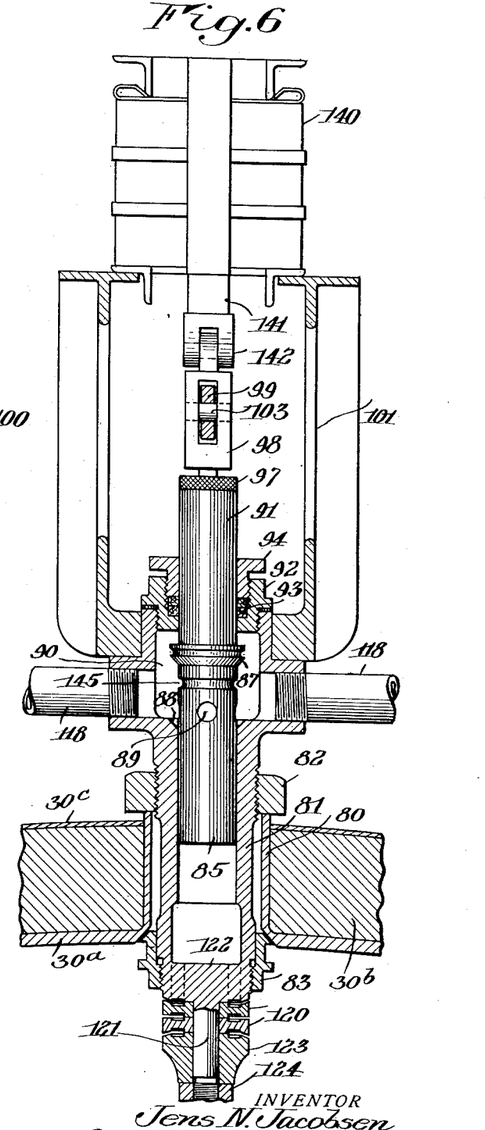
Fig. 6 is a vertical sectional view of the parts shown in Fig. 5, taken in a plane at right angles to the plane of Fig. 5.

When any spray valve is opened by raising the valve member upwardly to the position shown in Fig. 6, the washing liquid from the conduit 118 flows into the ports 89, downwardly through the cavity 86, and outwardly from a spray nozzle which may comprise a plurality of spray disks 120 mounted on a stud 121 depending from the cross piece 122 at the bottom of the valve body, the disks having peripheral rims. Below the bottom disk 120 is a sleeve 123 held in place by a cap nut 124. The top disk has the top of its peripheral rim slightly spaced from the bottom of the valve body and inclined in an upward direction, as plainly seen in Figs. 5 and 6, while the peripheral rims of the two disks 120 are spaced from each other to form a substantially horizontal opening. Between the peripheral rim of the lower disk 120 and the top of the sleeve 123 is another space inclined somewhat downwardly, as shown in the drawings. The washing liquid flowing downwardly through the valve is supplied to the spray nozzle inwardly of the peripheries of the disks through suitable passageways, and it issues outwardly through the spaces above mentioned, so that the liquid is sprayed in substantially all directions and falls upon substantially the entire inner surface of the tank, washing any residual milk or other matter therefrom.

Figure 8:
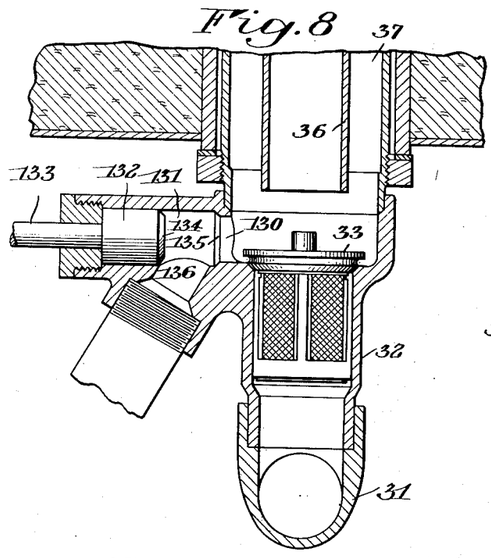
Fig. 8 is a view on a larger scale of a fragment of the construction shown in Fig. 7, taken in a plane at right angles to the plane of Fig. 7, and illustrating the washing liquid discharge valve.

Drainage means is provided for removing the washing liquid and any foreign matter washed out thereby from the tank, which drainage means is separate from the milk inlet and from the milk outlet, so that the washing liquid will not become mixed with the milk. This drainage means may be of the form shown in Fig. 8, in which the well 37 at the bottom of the tank is provided with a lateral discharge port 130 substantially at the extreme bottom of the well at the elevation of the inlet check valve 33, so that all liquid may drain out through this opening 130.

The discharge port 130 opens into a cavity 131 in which slides a valve plug 132 controlled by a stem 133. The plug 132 has a conical portion 134 which may be brought into contact with a conical seat 135 to close the port 130 and prevent escape of liquid therethrough. When the plug 132 is withdrawn from the seat 135 to the position shown in Fig. 8, however, liquid flowing from the discharge port 130 into the cavity 131 may pass out through a port 136 at the bottom of the cavity 131.

The spray valve and discharge valve may be controlled by any suitable mechanism, but are preferably operated automatically and in timed relation to the filling and emptying of the tank, so that the tank is always and automatically washed after each discharge of liquid therefrom and before the next filling thereof. Preferably also the control mechanism is so arranged that the discharge valve remains open for an interval after the spray valve is closed, in order to allow ample time for all washing liquid flowing down the walls of the tank to drain from the tank. Preferably also the outflow capacity of the discharge valve is equal to or greater than the inflow capacity of the spray valve so that no substantial accumulation of washing liquid will take place within the tank at any time.

The control means in its preferred form comprises electrical circuits controlled from the same control mechanism which fills and empties the tanks. To this end, each spray valve may be operated by a solenoid 140 (Figs. 5 and 6) having a plunger 141 pivoted at 142 to an ear on top of the block 98. When the solenoid is energized, the plunger pulls upwardly on the block which raises the spray valve 85 upwardly to the open position shown in Fig. 6, at the same time raising the lever 99 and the weight 102. When the solenoid 140 is deenergized, the weight 102 on the lever 99, assisted by the weight of the valve itself, firmly closes the valve. When the valve is closed any liquid leaking past the valve seat 88 is caught in a leakage groove 145 extending around the valve member and passes outwardly through a registering drainage opening 146 in the valve body.

Similarly, the discharge valve 132 may be controlled by a solenoid 150 having a plunger 151 secured to a rod 152 pivotally connected at 153 to one arm 154 of a bell crank which is pivoted at 155 to a bracket on the tank. The other arm 156 of the bell crank is pivoted at 157 to a rod 158 connected by the sleeve connection 159 to the stem 133 of the discharge valve 132. When the solenoid 150 is energized, it pulls upwardly on the plunger 151, rotating the bell crank in a clockwise direction about its pivot 155 and pulling leftwardly on the rod 158 to open the discharge valve to the position shown in Fig. 8. When the solenoid is deenergized, the weight of the plunger, assisted by the weight 160 on the arm 154 of the bell crank, shoves the rod 158 rightwardly and moves the discharge valve to the position shown in Fig. 4.

For controlling the respective solenoids, there is provided a control box 170 (Figs. 10, 12, and 18 to 20 inclusive) having five pairs of switches spaced at uniform intervals around the box, each pair comprising an upper switch 171 and a lower switch 172 having actuating plungers 173 and 174, respectively, projecting inwardly into the path of a control cam 175 fixed to a vertical shaft 176 which extends upwardly above the top of the box 170 and is provided with a gear 177 meshing with a gear 178 on the shaft 70. The gear 177 is five times the diameter of the gear 178, so that at each revolution of the shaft 70, the shaft 176 will be rotated through one-fifth of a revolution.

Figure 18:
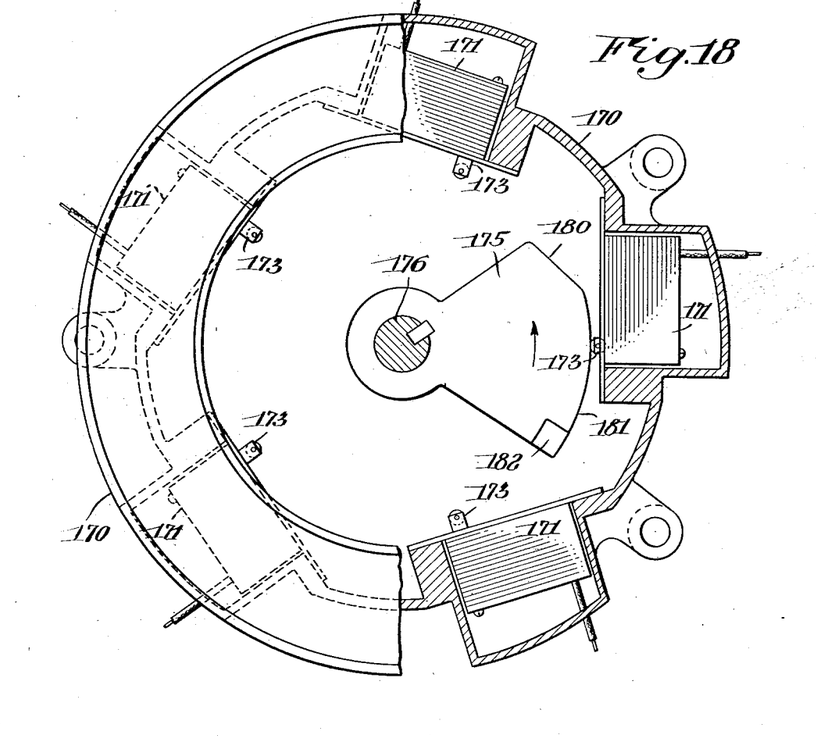
Fig. 18 is a plan of part of the control mechanism for the spray means and discharge means, with parts broken away and parts in section, showing the control cam in position for rendering both the spray means and discharge means of one of the tanks operative.
Figure 19:
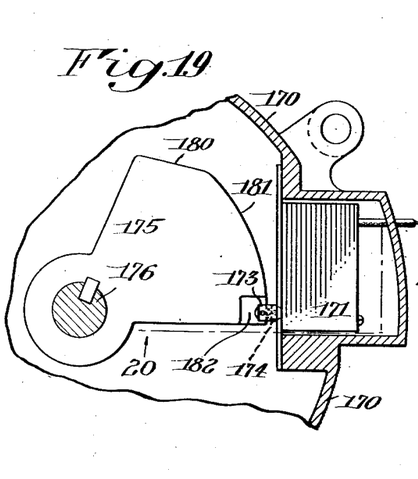
Fig. 19 is a view of a fragment of the structure shown in Fig. 18, illustrating the control cam in position to render the spray means inoperative while maintaining the discharge means operative.
Figure 20:
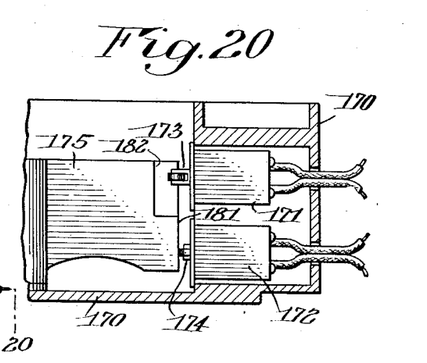
Fig. 20 is a vertical section substantially on the line 20—20 of Fig. 19.

The control cam 175, as best shown in Fig. 18, has an inclined portion 180 which actuates both plungers 173 and 174 of a pair of switches when the cam is rotated past any pair of switches in the direction of the arrow. The cam also has a concentric dwell portion 181 which maintains both plungers in actuated position, and at the upper corner of the dwell 181 is a cutout 182 which permits the plunger 173 of the upper switch 171 to return to initial position, while the plunger 174 of the lower switch 172 is still held in actuated position by the dwell 181. This position of the parts is illustrated in Figs. 19 and 20. It will be remembered that shaft 70 rotates intermittently, making one complete revolution in seven and one-half minutes, for example, and then being idle for seven and one-half minutes. The cam 175 is so placed on its shaft 176 that it will stop in the position shown in Figs. 19 and 20 relative to a pair of switches whenever the shaft 70 comes to rest. Then when the shaft 70 begins to turn again, the cam 175 will be driven forward, the plunger 174 which has been held in actuated position will be allowed to return to initial position, both plungers 173 and 174 of the next pair of switches will be actuated, and the cam will again come to rest with the cutout or notch 182 opposite the upper plunger 173 of this next pair of switches so that this plunger returns to initial position while the plunger 174 is still held in actuated position until the next movement of the cam.

Figure 9:
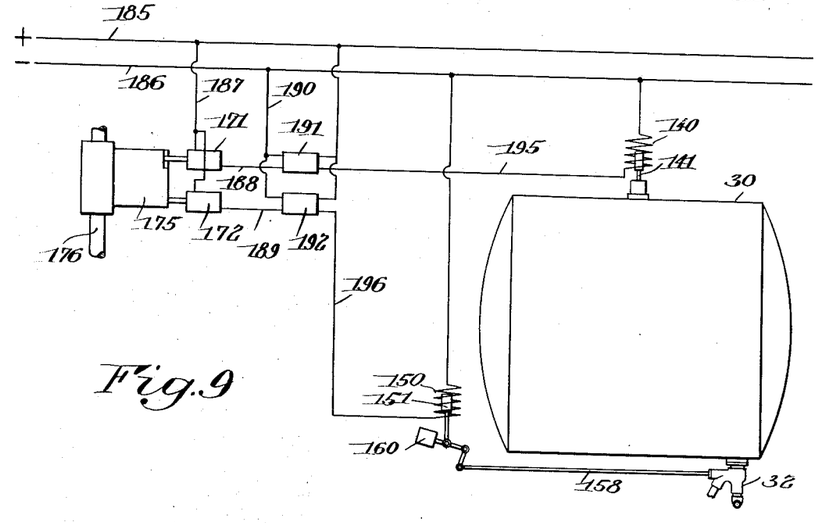
Fig. 9 is a diagram of the electrical connections for operating the spray valve and discharge valve.

Each switch 171 controls the spray valve solenoid 140 on one of the tanks 30, and the associated switch 172 beneath the switch 171 controls the discharge valve solenoid 150 on the same tank 30. If desired, direct electrical connections may be made from the switches to the solenoids, but it is preferred in practice to place the switches in supplementary circuits and to place the solenoids in relay circuits actuated by relays controlled by the switches. Fig. 9 illustrates diagrammatically the connections from one pair of switches 171 and 172 to one tank 30. A positive supply wire 185 and a negative supply wire 186 are connected to any suitable source of current, and from positive wire 185 a branch 187 leads to each of the switches 171 and 172. A circuit 188 from the switch 171 passes through a relay 191 and back through the return wire 190 to the negative supply line 186. A circuit 189 from the other switch 172 leads through another relay 192 and back to the negative line 186 through the same branch 190. The relay 191 controls a circuit 195 passing through the solenoid 140 while the relay 192 controls a circuit 196 passing through solenoid 150. These circuits, of course, are given only by way of example as a preferred embodiment of the invention, and may be varied at will.

Since the cam 175 during its rotation actuates both of the plungers 173 and 174 at the same time, it follows that the discharge valve 132 will be opened at the same time that the spray valve 85 is opened, and the discharge valve will be maintained in open position after the spray valve is closed by reason of the cutout or notch 182 in the cam 175. Hence all of the washing liquid introduced into the tank through the spray valve will be thoroughly drained from the tank before the next succeeding filling of the tank, and there is no chance for the milk or other fluid within the tank to be diluted or contaminated by washing liquid. In order to prevent an operator from raising the lever 99 by hand and thus introducing washing liquid into the tank without correspondingly opening the discharge valve, a dome 200 is preferably secured to the top of each tank and completely covers the spray valve and lever, so that the valve may be operated only through the automatic electrical circuits.

In operation, the vacuum port 53 of the control valve comes to rest in communication with the port 42 leading to the first tank 30, for example, in which case the pressure port 51 will be in communication with the port 42 leading to the third tank, and the ports 42 leading to the second, fourth, and fifth tanks will be in communication with the venting port 58 of the valve so that there is neither pressure nor vacuum in these tanks. The fourth and fifth tanks at this time will be filled with milk which is being held during the required holding period, and the switch control cam 175 will be at rest in the position illustrated in Figs. 19 and 20 with respect to the second tank, which means that this tank has been washed, the spray has been shut off, and the discharge valve is still open.

After the parts remain idle for seven and one-half minutes, or such other length of time as may be determined by the respective proportions of the gearing, shaft 70 will again make a complete revolution. Almost at the beginning of this revolution, the switch cam 175 will move slightly in a counter-clockwise direction from the position shown in Fig. 19, so that the plunger 174 of the second tank will return to its initial position and the discharge valve of this tank will be closed. The control valve 40 will also rotate in a counter-clockwise direction so that the vacuum port 53 will be brought out of communication with the first tank and into communication with the port 42 leading to the second tank. The first tank will thus begin its holding period and the second tank will commence being filled. Similarly, the pressure port 51 of the valve will be moved out of communication with the port 42 leading to the third tank and into communication with the port leading to the fourth tank, so as to empty this tank which has now completed its holding period. During this movement, the switch cam 175 will actuate both plungers 173 and 174 controlling both the spray valve and the discharge valve of the third tank, so that washing liquid will be sprayed into the tank to wash the inner surface thereof, and after this washing has continued for some moments, plunger 173 will be allowed by the cutout 182 to return to its initial position so that the spray valve will be closed, while the switch cam 175 will stop in position to maintain the plunger 174 in actuated position to hold the discharge valve open.

During the next succeeding rotation of the control shaft 70, the filling period of the second tank will be terminated and its holding period will begin; the filling period of the third tank will commence; the washing of the fourth tank will take place; and the milk will be discharged from the fifth tank, which has now finished its holding period. Tanks 1 and 2 will be holding their milk.

Inasmuch as the washing means is operated automatically by the same control mechanism which fills and empties the tanks, the cleansing of the tanks cannot be overlooked by the operator and it cannot take place at the wrong time, but will always be done after each emptying of each tank and prior to the next succeeding filling thereof.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Fluid treating apparatus including a fluid holding tank, mechanism for filling and emptying said tank, and spray means within said tank, characterized by means including an electric switch and an actuating cam therefor for operating said spray means automatically subsequently to each emptying of the tank, to wash the inner surface thereof.

2. Fluid treating apparatus including a fluid holding tank, mechanism for successively filling and emptying said tank at predetermined intervals, and means for introducing washing liquid into said tank, characterized by separate discharge means for said washing liquid, and means for opening said discharge means to discharge said washing liquid subsequently to an emptying of the tank and prior to the next succeeding filling thereof.

3. Fluid treating apparatus including a fluid holding tank, mechanism for filling and emptying said tank, and means for spraying washing liquid into said tank to wash the inner surface thereof, characterized by separate discharge means for said washing liquid, and means for operating said spraying means and said discharge means automatically subsequently to each emptying of the tank.

4. Fluid treating apparatus including a plurality of fluid holding tanks, and mechanism for successively filling and emptying said tanks according to a predetermined schedule, characterized by separate means for introducing washing liquid into each tank subsequently to each emptying thereof, and common mechanism for operating said separate introducing means according to a predetermined schedule.

5. Fluid treating apparatus including a plurality of stationary fluid holding tanks, and mechanism for successively filling and emptying said tanks according to a predetermined schedule, characterized by separate means associated with each tank for spraying washing liquid under pressure over substantially the entire inner surface of each tank subsequently to each emptying thereof, and common control mechanism for operating said separate spraying means according to a predetermined schedule.

6. Fluid treating apparatus including a plurality of fluid holding tanks, mechanism for successively filling and emptying said tanks according to a predetermined schedule, and means for spraying washing liquid into each tank to wash the inner surface thereof, characterized by separate discharge means for said washing liquid, and means for operating said spraying means and opening said discharge means subsequently to each emptying of each tank.

7. Fluid treating apparatus including a tank for holding fluid to be treated, mechanism for filling and emptying said tank, and means for introducing washing liquid into said tank to wash the inner surface thereof, characterized by separate discharge means for said washing liquid, and means including an electric circuit for operating said liquid introducing means and said discharge means.

8. Fluid treating apparatus including a tank for holding fluid to be treated, mechanism for filling and emptying said tank, means for introducing washing liquid into said tank to wash the inner surface thereof, and discharge means for said washing liquid, characterized by means including an electric circuit for opening and closing said liquid introducing means and said discharge means, and control mechanism for operating said electric circuit means, said control mechanism being effective to maintain said discharge means open until after said liquid introducing means has been closed.

9. Fluid treating apparatus including a tank for holding fluid to be treated, mechanism for filling and emptying said tank, means for introducing washing liquid into said tank to wash the inner surface thereof, and discharge means for said washing liquid, characterized by means including an electric circuit for opening and closing said liquid introducing means and said discharge means, and control mechanism including a cam member for operating said electric circuit means.

10. Fluid treating apparatus including a tank for holding fluid to be treated, mechanism for filling and emptying said tank, means for introducing washing liquid into said tank to wash the inner surface thereof, and discharge means for said washing liquid, characterized by means including an electric circuit for operating said liquid introducing means, a switch in said circuit, means including a second electric circuit for operating said discharge means, a second switch in said second circuit, and control mechanism for operating both of said switches and for maintaining one of said switches in operated position until after the other switch has returned to initial position.

11. Fluid treating apparatus including a tank for holding fluid to be treated, mechanism for filling and emptying said tank, means for introducing washing liquid into said tank to wash the inner surface thereof, and discharge means for said washing liquid, characterized by means including an electric circuit for operating said liquid introducing means, a switch in said circuit, means including a second electric circuit for operating said discharge means, a second switch in said second circuit, cam means for operating said switches, and mechanism for moving said cam means intermittently so that said cam means comes to rest between movements thereof, said cam means when in a position of rest being effective to maintain one of said switches in operated position.

12. Fluid treating apparatus including a plurality of fluid holding tanks, means for filling and emptying said tanks, and means associated with each tank for introducing cleaning fluid thereinto, characterized by means including an electric circuit for controlling each fluid introducing means, a switch associated with each electric circuit, and cam means for operating said switches.

13. Milk pasteurizer holding apparatus including a plurality of milk pasteurizer holding tanks, a vacuum line, a pressure line, and control mechanism for connecting each of said tanks in succession to said vacuum line to tend to fill the tanks with milk and to said pressure line to tend to discharge milk from said tanks, characterized by spray means associated with each tank for spraying washing liquid thereinto, means including an electric circuit for operating each spray means, and means operating in timed relation to said control mechanism for controlling said electric circuits.

14. Milk pasteurizer holding apparatus including a plurality of milk pasteurizer holding tanks, a vacuum line, a pressure line, and control mechanism for connecting each of said tanks in succession to said vacuum line to tend to fill the tanks with milk and to said pressure line to tend to discharge milk from said tanks, characterized by spray means associated with each tank for spraying washing liquid thereinto, discharge means for discharging washing liquid from each tank, means including an electric circuit for operating each spray means and each discharge means, and means operating in timed relation to said control mechanism for controlling said electric circuits, said last mentioned means being effective to operate the spray means and the discharge means associated with each tank after each tank has been emptied of milk, and to maintain said discharge means operative until after said spray means has been rendered inoperative.

15. Fluid treating apparatus including a plurality of tanks, means for filing said tanks with fluid to be treated and for emptying said tanks of said fluid, and spray means for spraying washing liquid within each of said tanks, characterized by conduit means for supplying washing liquid to each of said spray means, separate valves, one associated with the spray means of each of said tanks, for controlling flow of said washing liquid thereto, and means for automatically opening and closing said separate valves according to a predetermined schedule.

JENS N. JACOBSEN.